United States Patent
Felt et al.

(10) Patent No.: US 8,630,684 B2
(45) Date of Patent: Jan. 14, 2014

(54) ACCESSORY DEVICES FOR MOBILE PHONES

(75) Inventors: Michelle Felt, Randolph, NJ (US);
Brian F. Roberts, Frisco, TX (US);
Donald H. Relyea, Dallas, TX (US);
Heath Stallings, Colleyville, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 765 days.

(21) Appl. No.: 12/330,232

(22) Filed: Dec. 8, 2008

(65) Prior Publication Data

US 2010/0144392 A1 Jun. 10, 2010

(51) Int. Cl.
*H04B 7/00* (2006.01)
*H04B 1/38* (2006.01)
*H04M 1/00* (2006.01)

(52) U.S. Cl.
USPC ........ 455/566; 455/41.2; 455/90.1; 455/11.1; 455/74

(58) Field of Classification Search
USPC ............ 455/41.2, 90, 11.1, 66, 74, 556, 90.1, 455/566
See application file for complete search history.

(56) References Cited

U.S. PATENT DOCUMENTS

| | | | |
|---|---|---|---|
| 6,078,803 A * | 6/2000 | Fernandez Martinez | 455/349 |
| 6,304,765 B1 * | 10/2001 | Cosgrove et al. | 455/575.3 |
| 6,735,430 B1 * | 5/2004 | Farley et al. | 455/414.1 |
| 7,187,908 B2 * | 3/2007 | Fujisawa et al. | 455/88 |
| 7,251,197 B2 * | 7/2007 | Yoshida et al. | 368/10 |
| 7,373,110 B1 * | 5/2008 | McClain | 455/41.2 |
| 7,874,488 B2 * | 1/2011 | Parkinson | 235/487 |
| 7,881,702 B2 * | 2/2011 | Heyworth et al. | 455/414.1 |
| 8,311,480 B2 * | 11/2012 | Nagata et al. | 455/41.2 |
| 8,482,403 B2 * | 7/2013 | Thorn | 340/539.11 |
| 8,517,896 B2 * | 8/2013 | Robinette et al. | 482/8 |
| 2002/0142734 A1 * | 10/2002 | Wickstead | 455/90 |
| 2004/0102215 A1 * | 5/2004 | Karr et al. | 455/552.1 |
| 2004/0224638 A1 * | 11/2004 | Fadell et al. | 455/66.1 |
| 2006/0003700 A1 * | 1/2006 | Yasuda et al. | 455/41.2 |
| 2006/0050475 A1 * | 3/2006 | Chen | 361/683 |
| 2006/0128305 A1 * | 6/2006 | Delalat | 455/41.2 |
| 2007/0091582 A1 * | 4/2007 | Ku et al. | 361/814 |
| 2007/0146218 A1 * | 6/2007 | Turner et al. | 343/718 |
| 2007/0213100 A1 * | 9/2007 | Osann, Jr. | 455/567 |
| 2007/0238411 A1 * | 10/2007 | House | 455/41.2 |
| 2008/0081562 A1 * | 4/2008 | Nagata et al. | 455/41.2 |
| 2008/0086756 A1 * | 4/2008 | Kagle et al. | 725/108 |
| 2008/0133327 A1 * | 6/2008 | Ullah | 705/10 |
| 2008/0200208 A1 * | 8/2008 | Llanos et al. | 455/557 |
| 2009/0075692 A1 * | 3/2009 | Park et al. | 455/556.1 |
| 2009/0119819 A1 * | 5/2009 | Thompson | 2/209.13 |
| 2009/0128502 A1 * | 5/2009 | Li et al. | 345/173 |
| 2009/0164624 A1 * | 6/2009 | Metcalf et al. | 709/224 |
| 2009/0195350 A1 * | 8/2009 | Tsern et al. | 340/3.1 |
| 2009/0215397 A1 * | 8/2009 | Thorn et al. | 455/41.2 |
| 2009/0280861 A1 * | 11/2009 | Khan | 455/556.1 |
| 2009/0312063 A1 * | 12/2009 | Soto Nicolas | 455/566 |
| 2010/0087144 A1 * | 4/2010 | Korenshtein | 455/41.2 |
| 2010/0112964 A1 * | 5/2010 | Yi et al. | 455/90.3 |

(Continued)

*Primary Examiner* — Bobbak Safaipour (57) ABSTRACT

Implementations described herein relate to accessories for mobile phones. In one implementation, an accessory may include, a display to present information received from a mobile phone to a user of the accessory. The accessory may connect with the mobile phone to form a link to the mobile phone. The accessory may include a clothing attachment component to attach the accessory to the user or to clothing of the user.

23 Claims, 8 Drawing Sheets

(56) References Cited

U.S. PATENT DOCUMENTS

| | | |
|---|---|---|
| 2010/0173580 A1* | 7/2010 | Karaoguz et al. ............ 455/26.1 |
| 2010/0210210 A1* | 8/2010 | Panabaker et al. ........... 455/41.2 |
| 2010/0235425 A1* | 9/2010 | Holden et al. ................ 709/202 |
| 2010/0250794 A1* | 9/2010 | Hanks et al. .................... 710/33 |
| 2011/0021143 A1* | 1/2011 | Kapur et al. ................. 455/41.2 |
| 2011/0117841 A1* | 5/2011 | Thorn et al. ................. 455/41.2 |
| 2011/0165841 A1* | 7/2011 | Baek et al. ................... 455/41.2 |
| 2012/0322420 A1* | 12/2012 | Bolton et al. .............. 455/412.2 |
| 2013/0044215 A1* | 2/2013 | Rothkopf et al. ............. 348/143 |
| 2013/0107674 A1* | 5/2013 | Gossweiler et al. ............ 368/10 |
| 2013/0163390 A1* | 6/2013 | Gossweiler et al. ............ 368/14 |

* cited by examiner

ACCESSORY DEVICES FOR MOBILE PHONES

BACKGROUND INFORMATION

In an increasingly digitally connected world, telecommunication services play a crucial role in the daily operation of businesses and in consumers' lives. Telecommunication services commonly used by both businesses and consumers include telephone, network (e.g., Internet) connectivity, and television. These services are typically provided to the customer premises by a telecommunication provider through one or more wired or wireless connections.

Mobile communication devices (e.g., mobile phones such as cell phones), in particular, are frequently used by consumers to wirelessly receive information (e.g., web and email) and communicate with other consumers. For portability, mobile phones are typically made as small and light as possible. However, the inherent complexity of a mobile phone provides a lower limit to the size and/or cost with which a mobile phone can be produced.

DETAILED DESCRIPTION OF PREFERRED EMBODIMENTS

The following detailed description of exemplary embodiments refers to the accompanying drawings. The same reference numbers in different drawings may identify the same or similar elements. Also, the following detailed description does not limit the invention.

Implementations described herein relate to accessories for mobile phones. The accessories may be relatively small and lightweight electronic devices that communicate with the user's mobile phone. The accessories may be wearable and may provide information to the user through a display or through audible output. Additionally, in some implementations, an accessory may be associated with a network "personality" and may interact with or react to other accessories that are in the vicinity of the accessory.

Figure 1:
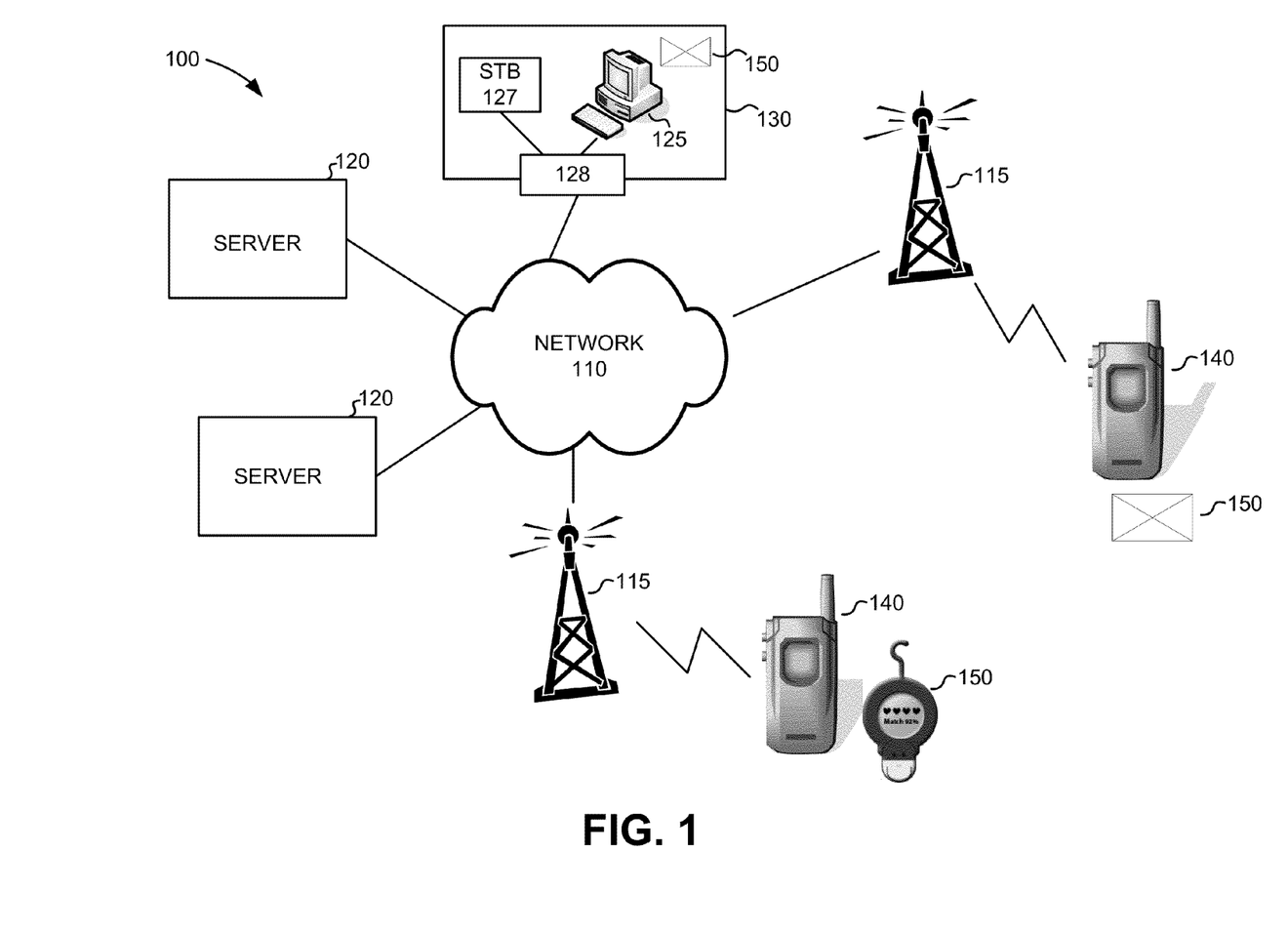
FIG. 1 is a diagram of an exemplary system in which concepts described herein may be implemented.

FIG. 1 is a diagram of an exemplary system 100 in which concepts described herein may be implemented. As illustrated, system 100 may include a network 110 that connects one or more server devices 120 to a customer premises 130 and to mobile phones (i.e., mobile communication devices) 140. In general, server devices 120 may provide or control, via network 110, telecommunication services such as wired network connectivity to customer premises 130 or wireless communication or data services to mobile phones 140.

Network 110 may include a network such as a cellular network, a satellite network, the Internet, a private WAN, or a combination of the Internet and a private WAN, that is used to transport data. Network 110 may include a number of separate networks that function to provide services to customer premises 130 and mobile phones 140. Antennas 115 are also shown in FIG. 1 to illustrate that network 110 may include wireless nodes, such as nodes used to implement the wireless portion of a cellular network. Mobile phones 140 may, for instance, connect to voice and data services through a cellular network that includes network 110 and antennas 115.

Server devices 120 may include servers or other network devices used to deliver or control delivery of telecommunication services to customer premises 130 and/or to mobile phones 140. For example, server devices 120 may include web servers, network switches or routers, network gateways, etc.

Customer premises 130 may include a number of electronic devices, such as a computing device 125 (e.g., a personal computer) and a set-top box (STB) 127. Customer premises 130 may additionally include devices that provide an interface to computing device 125 and to set-top box 127, such as, a local gateway 128 (e.g., a router, switch, or optical network terminal).

Computing device 125 may include, for example, a personal computer, such as a desktop computer, a laptop computer, a personal digital assistant (PDA), etc., used for general computing tasks.

Consistent with aspects described herein, user's of mobile phones 140 may obtain and use one or more accessories 150 in conjunction with a mobile phone 140. In some implementations, accessories 150 may also be used in conjunction with computing device 125 or, depending on the user's desire, with either computing device 125 or mobile phone 140. Accessories 150 may generally operate to provide the user with an additional source of information such as via a visual display or through audible information. Additionally, in one implementation, accessories 150 may interact with other accessories, such as accessories of other user's in the vicinity of the user, to create a social "personality" for the accessory. Accessories 150 will be discussed in more detail below.

Figure 2:
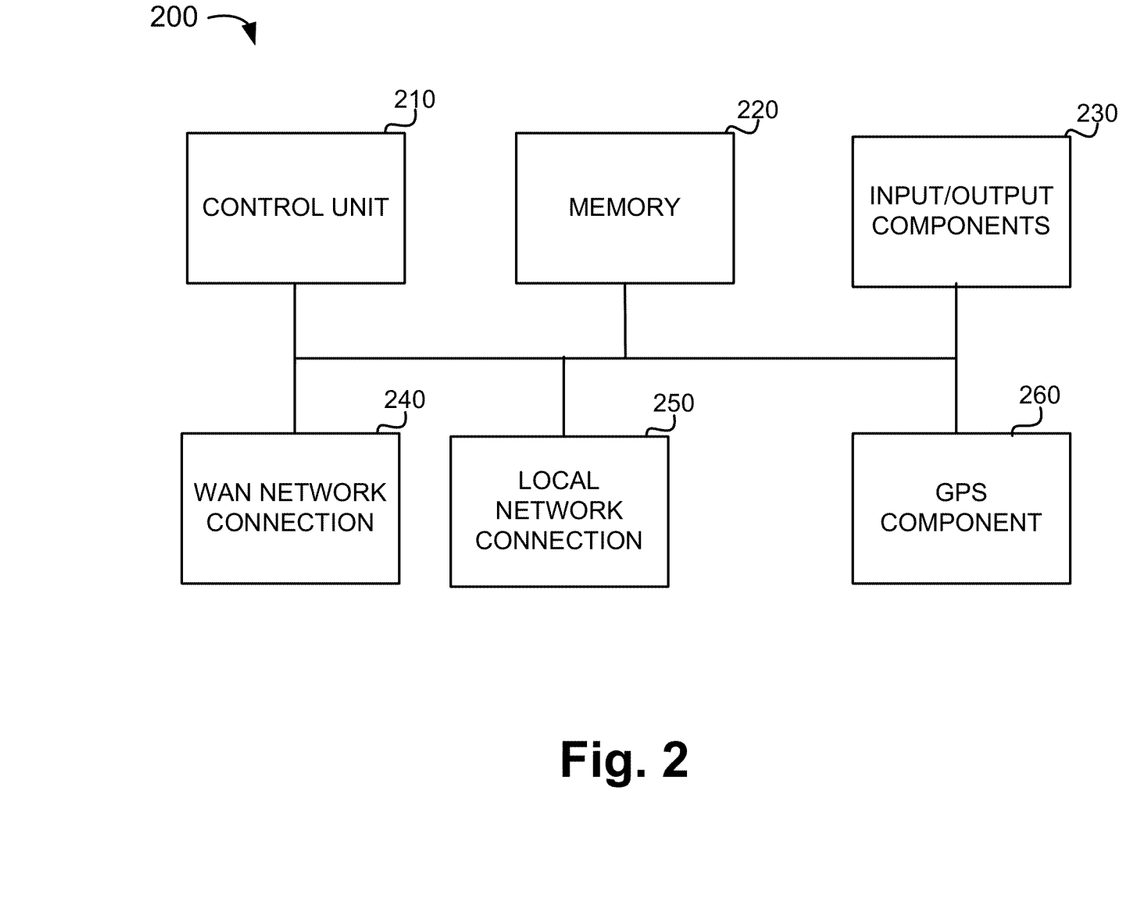
FIG. 2 is a diagram illustrating exemplary components of a mobile phone, such as a mobile phone shown in FIG. 1.

FIG. 2 is a diagram illustrating exemplary components of a mobile phone 200, such as one of mobile phones 140. Mobile phone 200 may include control unit 210, memory 220, input/output logic 230, wide area network (WAN) connection 240, local network connection 250, and global positioning system (GPS) component 260.

Control unit 210 may include a processor, microprocessor, or other type of processing logic that may interpret and execute instructions. Memory 220 may include a dynamic or static storage device that may store information and instructions for execution by control unit 210. For example, memory 220 may include a storage component, such as a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

Input/output components 230 may include components capable of providing information to the user or receiving information from the user. For example, input/output components 230 may include a liquid crystal display (LCD), light emitting diode (LED) display, or another type of visual display. For instance, the visual display may be any one of a number of possible display technologies, such as, a plasma display panel (PDP), a field emission display (FED), a thin film transistor (TFT) display, etc. The display may display, for example, text, image, and/or video information. Input/output components 230 may also possibly include a speaker for providing audible output and vibrating element for providing tactile output. Input/output components 230 may also include a one or more components for receiving input from the user. Input/output components 230 may particularly include, for example, a keypad, a microphone, a camera, a video camera, or a touch pad.

WAN network connection 240 may include a wireless transceiver that enables device 200 to communicate with antennas 115. Through WAN network connection 240, users of mobile phone 200 may communicate over a cellular network to, for example, place voice calls to other users, exchange text messages with other users, or send/receive data.

Local network connection 240 may include mechanisms for connecting to other devices that are in proximity to mobile phone 200. For instance, local network connection 250 may include circuitry for implementing a short-range wireless protocol such as Bluetooth or an IEEE 802.11 wireless technologies ("WiFi") based protocol. In some implementations, local network connection 250 may also provide ports for connecting mobile phone 200 to other devices using a wired connection, such as a connection for a Universal Serial Bus (USB) connection or an Ethernet connection.

Global positioning system (GPS) component 260 may include logic to receive signals from a satellite system and, based on the signals, determine the current location of mobile phone 200. The satellite system may include the Global Navigation Satellite System (GNSS). Alternatively, other techniques for determining the location of mobile phone 200 may be used, such as triangulation via antennas 115 or based on location information received over local network connection 250.

Figure 3:
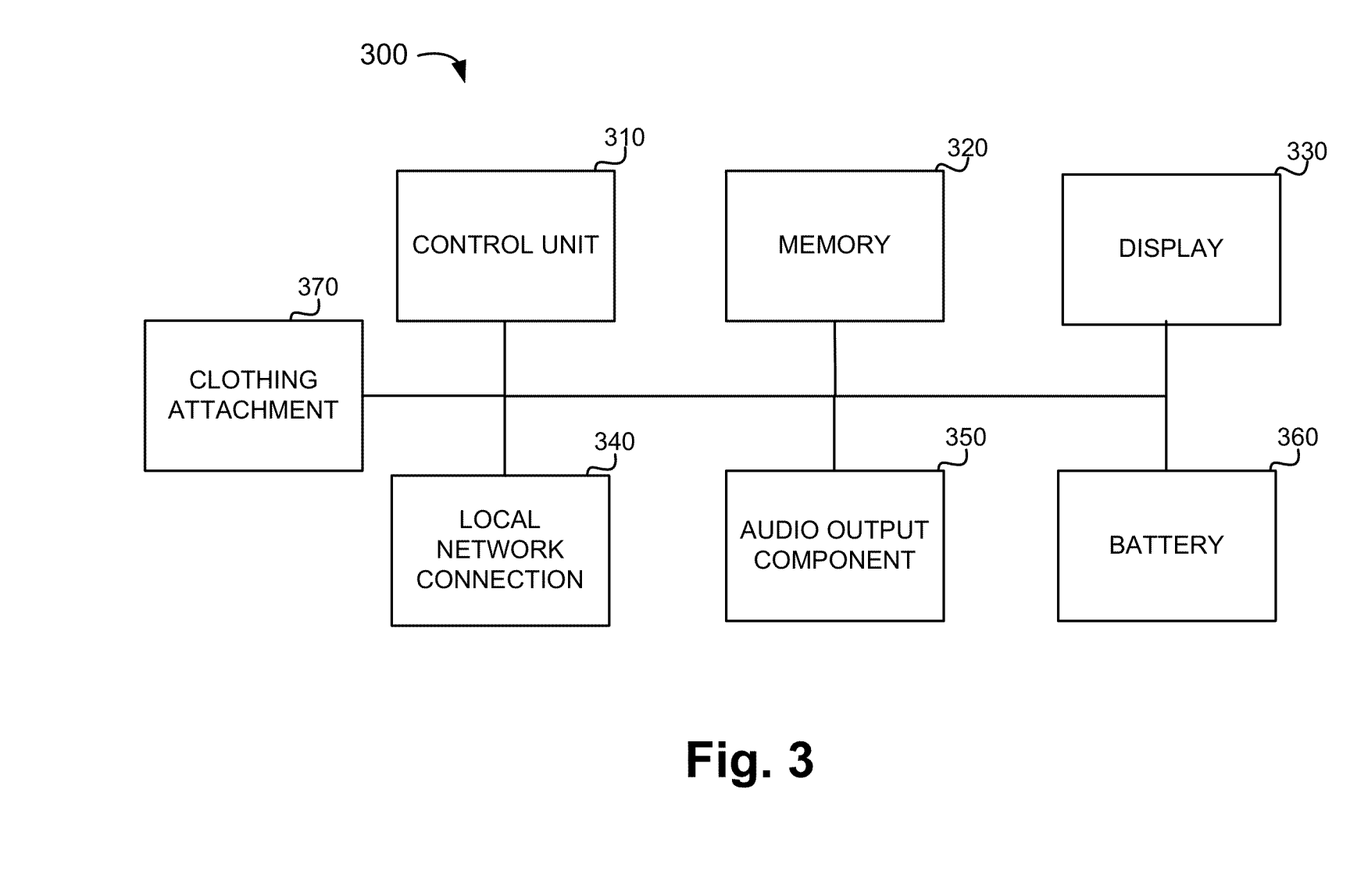
FIG. 3 is a diagram illustrating exemplary components of an accessory, such as an accessory shown in FIG. 1.

FIG. 3 is a diagram illustrating exemplary components of an accessory 300, such as one of accessories 150. Accessory 300 may include control unit 310, memory 320, display 330, local network connection 340, audio output component 350, battery 360, and clothing attachment 370.

Control unit 310 may include a processor, microprocessor, or other type of processing logic that may interpret and execute instructions. Memory 320 may include a dynamic or static storage device that may store information and instructions for execution by control unit 310.

Display 330 may include display through which information can be shown to the user. For example, display 330 may include a liquid crystal display (LCD) or another type of visual display. Display 330 may be a display designed to use relatively little power in order to conserve battery 360. In one possible implementation, display 330 may be based on e-paper technology, which is a technology designed to mimic the appearance of ordinary ink on paper. Several different technologies are known for implementing e-paper displays, such as those based on a combination of a plastic substrate and electronics to obtain electronic "paper" that reflects light like ordinary paper and is capable of holding text and images indefinitely without drawing electricity.

Local network connection 340 may include mechanisms for connecting to other devices that are in proximity to accessory 300. For instance, local network connection 340 may include circuitry for implementing a short-range wireless link such as a Bluetooth link or one based on the IEEE 802.11 wireless technologies ("WiFi"). In some implementations, local network connection 340 may also provide ports for connecting accessory 300 to other devices using a wired connection, such as a port for a Universal Serial Bus (USB) connection or an Ethernet connection. For example, accessory 300 may connect to mobile phone 200 through a USB connection. In one implementation, local network connection may 340 may be particularly designed to connect with mobile phone 200.

Audio output component 350 may include a speaker for outputting audible signals to the user of accessory 300. In some implementations, audio output component 350 may be omitted.

Other types of output mechanisms may also be implemented as part of accessory 300. For example, accessory 300 may be designed to vibrate or perform other mechanical actions.

Battery 360 may include an electrochemical storage device. Battery 360 may provide power to control unit 310, memory 320, display 330, local network connection 340, and audio output component 350. Battery 360 may be a single use battery or a rechargeable battery.

Clothing attachment 370 may include a device allowing accessory 300 to be worn as an article of clothing. Clothing attachment 370 may include, for example, a pin for pinning accessory 300 to clothing, a band or chain that allows accessory 300 to be worn as a necklace or bracelet, a keychain ring that allows accessory 300 to be used as a keychain attachment, or a belt clip.

Accessory 300 may generally be manufactured in a form that is relatively light weight and can be worn as an article of clothing by the user. For instance, accessory 300 may be manufactured as a pin, a bracelet, a necklace, a keychain attachment, etc. In some implementations, accessory 300 may further be designed to have a form that pertains to an intended function of the accessory. For instance, a sports accessory for displaying sports scores and may be designed in the shape of a sporting object, such as a football.

Figure 4:
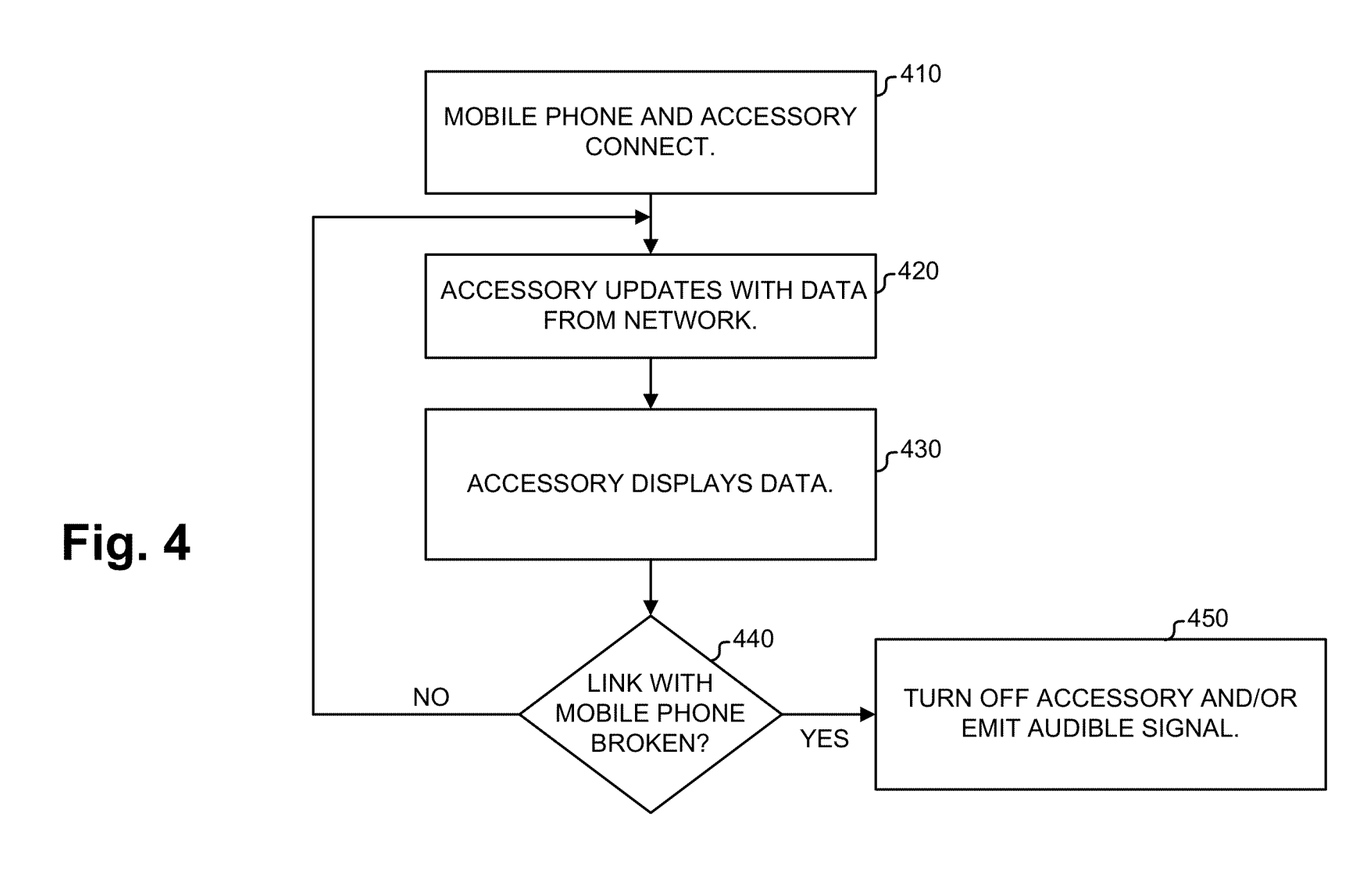
FIG. 4 is a flow chart illustrating exemplary interactions of an accessory with a mobile phone.

FIG. 4 is a flow chart illustrating exemplary interactions of accessory 300 with mobile phone 200.

To begin, mobile phone 200 and accessory 300 may connect to one another (block 410). In one implementation, the connection may be made through a local wireless connection, such as via a Bluetooth connection. Alternatively, accessory 300 may be designed to connect to mobile phone 200 through a cable connection, such as through a USB cable connection. Accessory 300 may include one or more buttons or switches, such as an on/off switch, through which the user can control the connection of accessory 300 to mobile phone 200. For example, accessory 300 may, whenever it is turned on, attempt to establish a connection with mobile phone 200.

Accessory 300 may, at various times, be updated by mobile phone 200 (block 420). The data may particularly be data that mobile phone 200 receives via network 110 (i.e., the cellular network), although data from other sources, such as data stored locally on mobile phone 200, may also be sent to accessory 300. The data may be, for example, sports score updates, financial information, or social networking related information. The data may be sent by, for example, server devices 120.

Accessory 300 may display the received data (block 430). Accessory may use display 330 to display the data. In implementations in which accessory 300 includes a speaker, accessory 300 may additionally or alternatively output an audible signal based on the received data. For example, accessory 300 may emit a sound to indicate it was recently updated or to indicate when a person with a similar accessory comes into the vicinity of the user. In some implementations, accessory 300 may notify the user that new information is being displayed at accessory 300. For instance, accessory 300 may emit a sound or vibrate to let the user know new information has been received.

In some implementations, accessory 300 may perform an action when the accessory loses contact with mobile phone 200. As shown in FIG. 4, accessory 300 may detect when the link, such as a local wireless connection or a wired connection, with mobile phone 200 is broken (block 440). In response to the link with mobile phone 200 ending, accessory 300 may perform an action, such as turning itself off or emitting an audible signal (block 450).

Although accessory 300 was generally described as connecting and communicating through mobile phone 200, it some implementations, accessory may connect and communicate through another device, such as computing device 125. For example, accessory 300 may wirelessly or through a cable connection, connect to computing device 125. Accessory 300 interact with computing device 125 in a manner similar to how it interacted with mobile phone 200.

Figure 5:
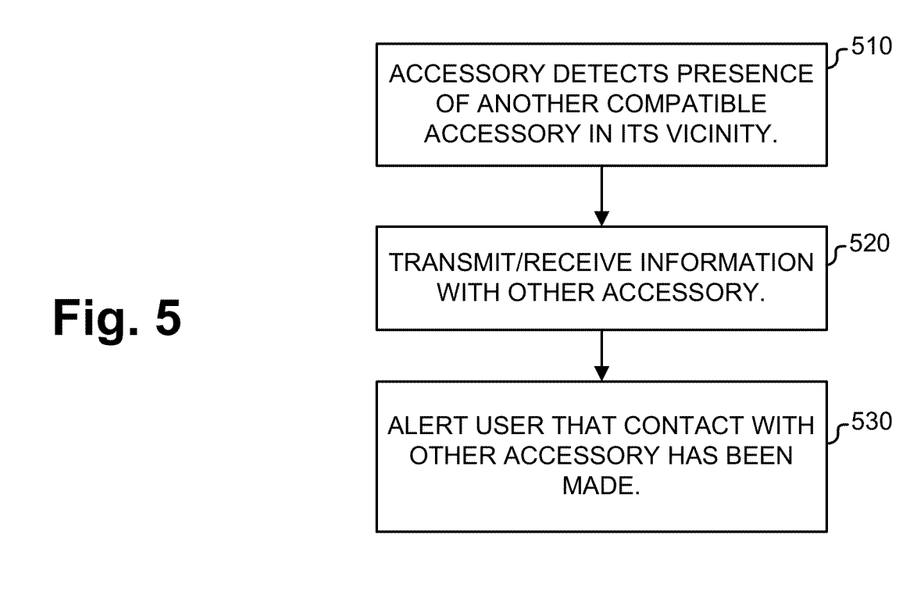
FIG. 5 is a flow chart illustrating exemplary operations for using an accessory as a social networking device.

In addition to acting as a data display or audiblization device linked to mobile phone 200, accessory 300 may, in some implementations, be used in a social networking capacity. FIG. 5 is a flow chart illustrating exemplary operations for using accessory 300 as a social networking device.

A user carrying accessory 300 may move in and out of the vicinity of other users carrying accessories. Accessory 300 may detect the presence of another compatible accessory that is in its vicinity (block 510). An accessory may detect that it is in the vicinity of another compatible accessory using a number of possible techniques. For example, mobile phone 200 may periodically determine its position using GPS component 350 and then transmit its position, via network 110, to one of server devices 120. Other users with compatible social networking accessory devices may similarly store their location at the server. When the server detects that two compatible accessories are in the vicinity of one another, such as within a distance less than a pre-defined threshold, the server may inform the mobile phones associated with the two accessories, which may then update the accessories. Whether two accessories are "compatible" may refer to whether the accessories are registered as being in a group that desires to be alerted when other members of the group are in the vicinity of one another. For example, a group may include a group of friends that are linked together from a social networking site, an alumni group from a school, or a group of people registered in a dating group.

In some implementations, instead of or in addition to using network 110 to detect the presence of compatible accessories in the vicinity of one another, two accessories (or the corresponding mobile phones) may directly detect the presence of one another. In particular, the accessories may directly detect the presence of one another through the local wireless connection, such as a Bluetooth or other local wireless connection. In this implementation, accessory 300 may be configured to establish peer-to-peer connections with other devices. As part of the connection, accessory 300 may determine if the other device is a compatible accessory device.

After accessory 300 detects the presence of another accessory, it may, in some implementations, exchange information (e.g., transmit and/or receive information) with the other accessory (block 520). For example, personal information, such as a user's name, physical description, favorite music, or other information may be exchanged. As another example, for an accessory designed as an accessory to help people meet one another (i.e., a social network dating accessory), the connected accessories may exchange information relating to the potential compatibility of the two users. It can be appreciated that, depending on the particular implementation of the accessories, the exchange of information between the accessories may be performed over network 110 or through a local wireless connection.

Accessory 300 may alert the user that contact has been made with another accessory (block 530). For instance, accessory 300 may make a sound, display information relating to the other user, or both. For example, accessory 300 may display the distance to the other user or display other information about the other user.

Although the description of the operation of a social network accessory device was generally described with respect to FIG. 5 as directly detecting the presence of a communication with another accessory, it can be appreciated that the actual communication could be performed by the mobile phones corresponding to the accessory. The mobile phones may then transmit information that is to be displayed or audibilized to the accessory. In other words, in this implementation, mobile phones 200 may implement the "logic" related to the social network application and accessory 300 may be used as display or audibilization devices for mobile phones 200.

FIGS. 6A-6F are diagrams illustrating various exemplary implementations of accessory 300.

Figure 6A:
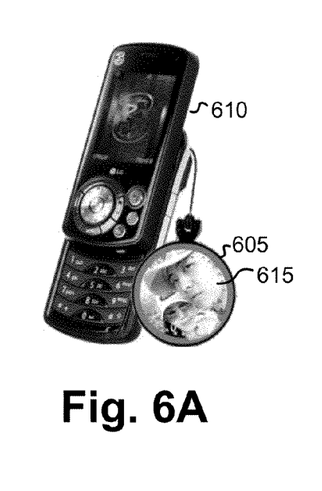
FIGS. 6A-6F are diagrams illustrating various exemplary implementations of an accessory.

As shown in FIG. 6A, an accessory 605 is designed to attach to a mobile phone 610. Accessory 605 may be particularly designed to display images, such as user photos, and may include a display 615, such as an e-paper display or an LCD display, that may display pictures downloaded from mobile phone 610 to accessory 605. Accessory 605 may connect to mobile phone 610 via, for example, a USB cable connection or a local wireless connection (e.g., Bluetooth). In the case of a cable connection, the connecting cable may act to both physically keep accessory 605 attached to mobile phone 610 and provide a communication channel to accessory 605. Additionally, the connecting cable may be used to provide power to accessory 605, potentially allowing accessory 605 to be designed without a battery.

Figure 6B:
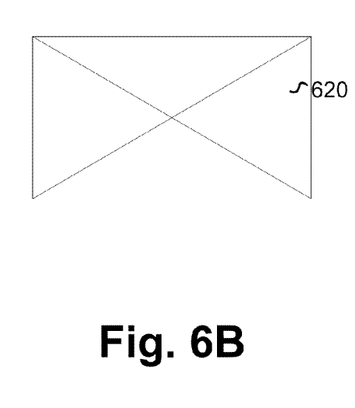

As shown in FIG. 6B, an accessory 620 is shown as an accessory designed to display sports updates, such as sports scores. In this example, the outer casing of accessory 620 may be decorated in the color and visual style of a particular sports team. Accessory 620 may be a pin-on accessory that is designed to be worn on an article of clothing, such as a hat, coat, shirt, etc. Accessory 620 may communicate with mobile phone 200 of the user via, for example, a local wireless connection (e.g., Bluetooth). Mobile phone 200 may transmit information (e.g., sports scores) for display on accessory 620 as the information is received over network 110.

Figure 6C:
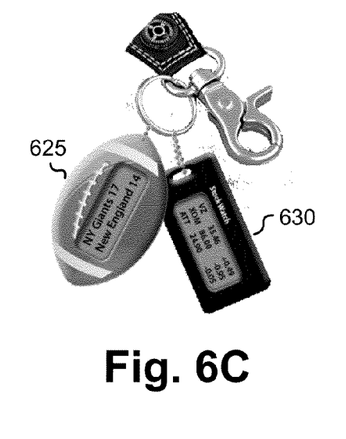

In FIG. 6C, accessories 625 and 630 are shown as accessories that are designed to attach to a keychain ring. Accessories 625 and 630 may connect to mobile phone 200 via a local wireless link (e.g., Bluetooth). Each of accessories 625 and 630 may be an accessory designed to present a certain type of data to the user. For example, accessory 625 may be a "sports update" accessory, similar to accessory 620. Accessory 630 may be an accessory that displays financial information, such as updating quotes for various securities. In one implementation, the user may, through mobile phone 200, enter the names of the securities for which the user would like to view updates. Mobile phone 200 may then transmit the desired names to accessory 630 as well as any updates to the security prices that are received over network 110.

Figure 6D:
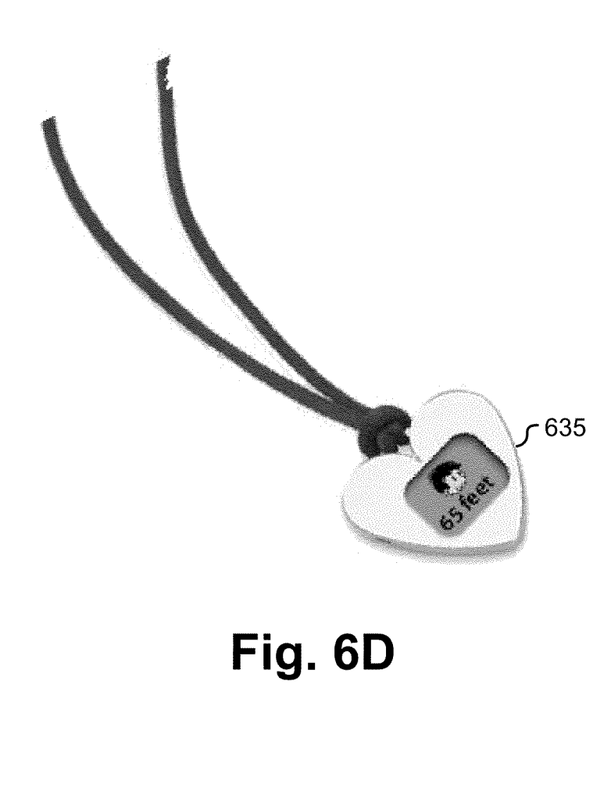

As shown in FIG. 6D, an accessory 635 is designed as an accessory that may be worn as a necklace. Accessory 635 may be particularly designed as a social networking accessory. Accessory 635 may interact with accessories of other users in the vicinity of accessory 635 and may display a message, such as the distance to the other user or name of the other user, or make a sound when other users are in the vicinity of accessory 635. For example, the user may be part of a group of people that have social accessories compatible with accessory 635 (e.g., a group of friends, alumni of a particular school, etc.). As previously discussed, accessory 635 may determine, using a number of possible techniques, when another compatible accessory is in its vicinity. For example, mobile phone 200 may periodically send its location to server device 120, and receive back the location of any nearby users that are in the same social group. Mobile phone 200 may then update accessory 635 based on this information. Alternatively, mobile phone 200 or accessory 635 may use its local wireless network connection to directly scan for other users that are in the vicinity of the local wireless connection.

In the context of a social networking accessory, such as accessory 635, in some implementations, accessory 635 can communicate with another user even if the other user does not have an accessory. For instance, the other user may update server 120 with location information. In this situation, the user of accessory 635 may still obtain a benefit from having a readily available accessory through which the social network information can be displayed. The other user may receive the social networking information through their mobile phone.

Figure 6E:
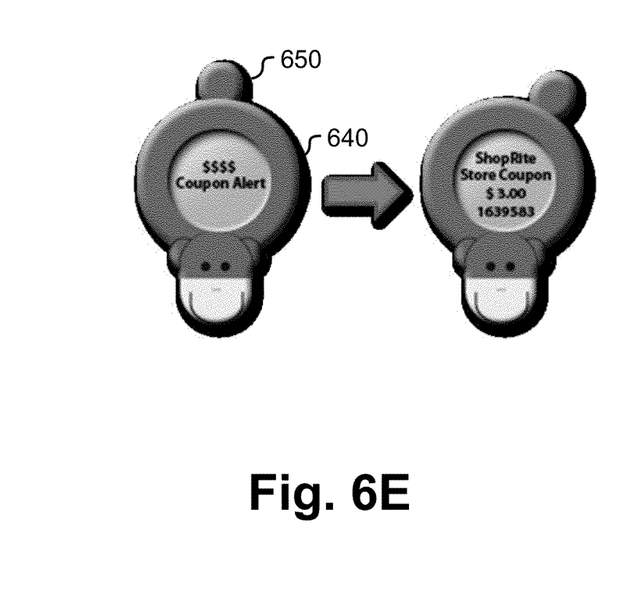

As shown in FIG. 6E, an accessory 640 includes a moving part 650. The accessory may actuate moving part 650 based on information received at the accessory 640. Two different views of accessory 640 are shown in FIG. 6E, in which moveable part 650 is in different positions in the two different views. In this way, the user can be alerted by a change in the appearance of the accessory. As an example of the use of this kind of accessory, assume accessory 640 provides an alert whenever online coupons are detected for a store at which the user is shopping. When a coupon is located, movable part 650 of accessory 650 may be actuated to alert the user. The user can then look at the screen of accessory 640 or mobile phone 200 for more detailed information regarding the coupon.

Figure 6F:
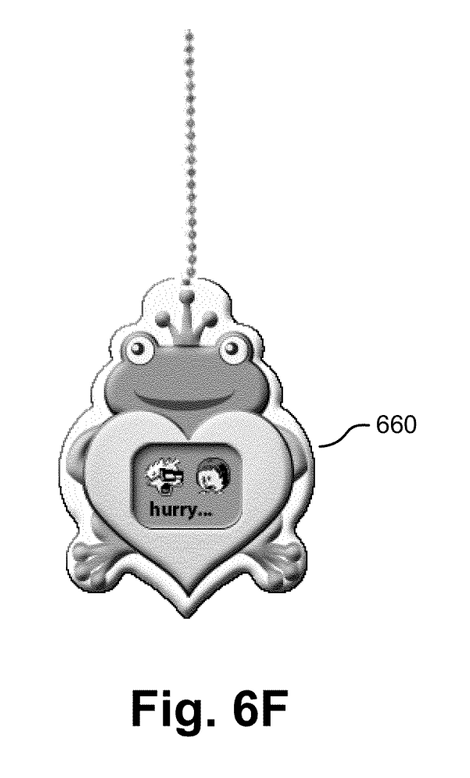

As shown in FIG. 6F, an accessory 660 is designed to act as a virtual pet. Accessory 660 may for instance, be able to move its body parts (e.g., wag a tail, move an arm in a waving motion) light-up, or make sounds that are designed to be actions of an electronic pet. Accessory 660 may have virtual moods. For instance, the accessory may be unhappy if the user has not interacted with accessory 660 within a certain time period. Virtual pet accessories of different users may interact when they come into range of one another. For example, virtual dog accessories may emit barking sounds or activate a flashing light when they come into range of one another.

Virtual pet accessory 660 may additionally interact with the user in a number of ways, examples of which will now be given. Accessory 660 may, based on the location of the user, emit a signal. For instance, if the user regularly frequents a particular coffee shop, accessory 660 may emit a sound, such as a barking sound, when the user is near the coffee shop or when it is the user's normal time to visit the coffee shop. When accessory 660 is near the user's home or the user enters a favorite location, accessory 660 may enter a "happy" mode. The happy mode may be visually indicated by, for example, a smiling face on the display of accessory 660.

When an incoming call is received from a particular set of friends of the user, mobile phone 200 may inform accessory 660 of the call, and accessory 660 may emit a sound or action, such as emitting a barking or purring sound. In yet another implementation, when accessory 660 or mobile phone 200 determines that the user is upset or excited based on, for example, analysis of the user's speech (e.g., a high tone of voice, speaking fast, or particular key words may indicate the user is upset or excited), accessory 660 may change its behavior or enter a "sad" mode. Accessory 660 may also perform an action, such as emitting an audible sound, when the user moves out of a certain range from accessory 660. For instance, when the local connection between accessory 300 and mobile phone 200 is broken, accessory 660 may make a barking sound (or other sound).

Accessories can also be used as a child monitor. For instance, a child may wear an accessory, such as accessory 635. Accessory 635 may communicate with mobile phone 200, which is carried by a parent. From the mobile phone, the parent may be able to monitor the distance and direction to accessory 635. If the child moves too far from the parent, such as out of range of the accessory, accessory 635 and/or mobile phone 200 may emit an audible warning sound.

The foregoing description of implementations provides illustration, but is not intended to be exhaustive or to limit the implementations to the precise form disclosed. Modifications and variations are possible in light of the above teachings or may be acquired from practice of the teachings.

While a series of operations have been described with regard to FIGS. 4 and 5, the order of the acts may be varied in other implementations consistent with the invention. Moreover, non-dependent acts may be implemented in parallel.

It will also be apparent that aspects described herein may be implemented in many different forms of software, firmware, and hardware in the implementations illustrated in the figures. The actual software code or specialized control hardware used to implement aspects described herein is not intended to limit the scope of the invention. Thus, the operation and behavior of the aspects were described without reference to the specific software code—it being understood that software and control hardware can be designed to implement the aspects based on the description herein.

Further, certain aspects described herein may be implemented as "logic" or as a "component" that performs one or more functions. This logic or component may include hardware, such as an application specific integrated circuit or a field programmable gate array, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed:

1. A device comprising:
   a local connection component to:
      form a link to a mobile phone;
   a component to:
      receive update information from the mobile phone,
         the update information being received over the link,
      receive, from a user of the device, parameters for displaying the update information, the parameters being used by the device to customize
the display of the update information,
determine that a connection with the mobile phone is
broken,
perform, based on determining that the connection is
broken, an action,
detect location information regarding another device,
establish, based on the received location information, a
peer-to-peer connection with the other device, and
receive information from the other device using only a
short-range wireless link;
a display to:
display, based on the received parameters, the update
information, and
display the received information from the other device;
and
an attachment component to attach the device to the user.

2. The device of claim 1, where the local connection component connects with the mobile phone using a local wireless connection or a local cable connection.

3. The device of claim 1, where the attachment component includes one of a pin, a band, a chain, a keychain ring, or a belt clip.

4. The device of claim 1, further comprising:
a speaker for outputting audio information.

5. The device of claim 1, where the display includes a display based on e-paper technology.

6. The device of claim 1, where the display includes a liquid crystal display (LCD) or light emitting diode (LED) display.

7. The device of claim 1, where the action includes turning off the device.

8. The device of claim 1, further comprising:
a speaker for outputting audio information, and
where the action includes playing a sound through the speaker to indicate that the link has been broken.

9. The device of claim 1, further comprising:
a part to actuate based on the update information received from the mobile phone.

10. A method comprising:
detecting, by a first device associated with a first user, a presence of a second device in a local vicinity of the first device based on location information associated with the first device and location information associated with the second device;
establishing, by the first device and based on detecting the presence of the second device, a peer-to-peer connection with the second device;
exchanging, by the first device, information relating to a user of the second device using only a short-range wireless link;
presenting, by the first device, the exchanged information;
receiving, by the first device, update information from a mobile phone of the first user;
receiving, by the first device, parameters for displaying the update information,
the parameters being used by the first device to customize the display of the update information;
presenting, by the first device and based on the received parameters, the update information from the mobile phone;
determining, by the first device, that a link to the mobile phone is broken; and
performing, by the first device and based on determining that the connection is broken, an action.

11. The method of claim 10, where the first device is attached to the first user.

12. The method of claim 10, where the detection of the presence of the second device is performed via a local wireless connection implemented between the first device and the second device.

13. The method of claim 10, where the detection of the presence of the second device is performed by the mobile phone.

14. The method of claim 10, where presenting the information includes displaying the information or emitting an audible signal based on the information.

15. The method of claim 10, where the presented update information includes:
information relating to a location of the user of the second device;
information relating to a potential compatibility of the first user and the user of the second device; or
at least one of a name, physical description, or distance from the first user to the user of the second device.

16. The method of claim 10, where the exchanging of information with the second device is performed when the first device and the second device are each members of a same social group.

17. A system comprising:
an accessory device connected to a mobile phone, the accessory device including:
a local network connection component to connect to the mobile phone and receive update information from the mobile phone,
a component to:
receive the update information from the local network connection component,
receive, from a user of the accessory device, parameters for displaying the update information,
the parameters being used by the accessory device to customize the display of the update information,
determine that a link to the mobile phone is broken,
perform, based on determining that the connection is broken, an action,
detect location information regarding another accessory device,
establish, based on the received location information, a peer-to-peer connection with the other accessory device, and
receive information from the other accessory device, using only a short-range wireless link, and
a display to:
display the received information from the other accessory device; and
display, based on the received parameters, the update information.

18. The system of claim 17, where the accessory device further includes an attachment component to attach the accessory device to the user.

19. The system of claim 18, where the attachment component includes one of a pin, a band, a chain, a keychain ring, or a belt clip.

20. The system of claim 17, where the local network connection component includes a local wireless connection component or a local cable connection component.

21. The system of claim 17, where the display includes a display based on e-paper technology.

22. The device of claim 1, where the update information includes one of:
score updates,
financial information, or
social networking information.

23. The method of claim 10, where, when performing the action, the method includes one of:
  turning off the device; or
  outputting a sound.

* * * * *